United States Patent [19]

Falknor et al.

[11] Patent Number: 4,557,339

[45] Date of Patent: Dec. 10, 1985

[54] BOREHOLE CONDITIONING APPARATUS

[75] Inventors: Charles L. Falknor; Vincent H. Vetter; Dale R. Wolfer; Dalton K. Lyon, all of Houston, Tex.

[73] Assignee: Hughes Tool Company, Houston, Tex.

[21] Appl. No.: 454,591

[22] Filed: Dec. 30, 1982

[51] Int. Cl.[4] ............................................. E21B 17/10
[52] U.S. Cl. ................................... 175/325; 175/406;
308/4 A; 403/381
[58] Field of Search ................ 175/325, 406; 166/241;
308/4 A; 39/252, 526, 426.5, 426.6; 403/319,
375, 381

[56] References Cited

U.S. PATENT DOCUMENTS

| 2,288,124 | 6/1942 | Creighton | 308/4 R |
| 2,973,996 | 3/1961 | Self | 308/4 A |
| 3,306,381 | 2/1967 | Garrett et al. | 175/346 |
| 3,370,657 | 2/1968 | Antle | 175/74 |
| 3,454,308 | 7/1969 | Kennedy | 308/4 A |
| 3,535,204 | 10/1970 | Truxa | 162/352 |
| 3,680,646 | 8/1972 | Hughes et al. | 175/325 X |
| 3,818,999 | 6/1974 | Garrett | 308/4 A X |
| 3,907,048 | 9/1975 | Gray | 175/325 |
| 4,106,823 | 8/1978 | Bassinger | 308/4 A |
| 4,190,124 | 2/1980 | Terry | 175/406 |
| 4,227,586 | 10/1980 | Bassinger | 175/346 |
| 4,231,437 | 11/1980 | Swersky et al. | 175/325 |
| 4,280,742 | 7/1981 | Justman | 308/4 A |
| 4,378,852 | 4/1983 | Garrett | 175/325 |
| 4,428,626 | 1/1984 | Blau et al. | 308/4 A |

FOREIGN PATENT DOCUMENTS 1098894  4/1981  Canada ................. 175/408

Primary Examiner—Stephen J. Novosad
Assistant Examiner—William P. Neuder
Attorney, Agent, or Firm—W. G. Schuurman; H. Dennis Kelly

[57] ABSTRACT

A borehole conditioning tool suitable for use in a drill string, the tool including a tubular body portion having a plurality of elongated, circumferentially spaced retainer slots for housing wall contacting members, each retainer slot being defined by a pair of opposed elongated slot side walls and a plurality of wall contacting members in the form of elongated stabilizer blades which are mounted in the retainer slots, each stabilizer blade having a pair of opposed blade side walls. In the borehole conditioning tool the slot side walls and blade side walls are shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot.

45 Claims, 18 Drawing Figures

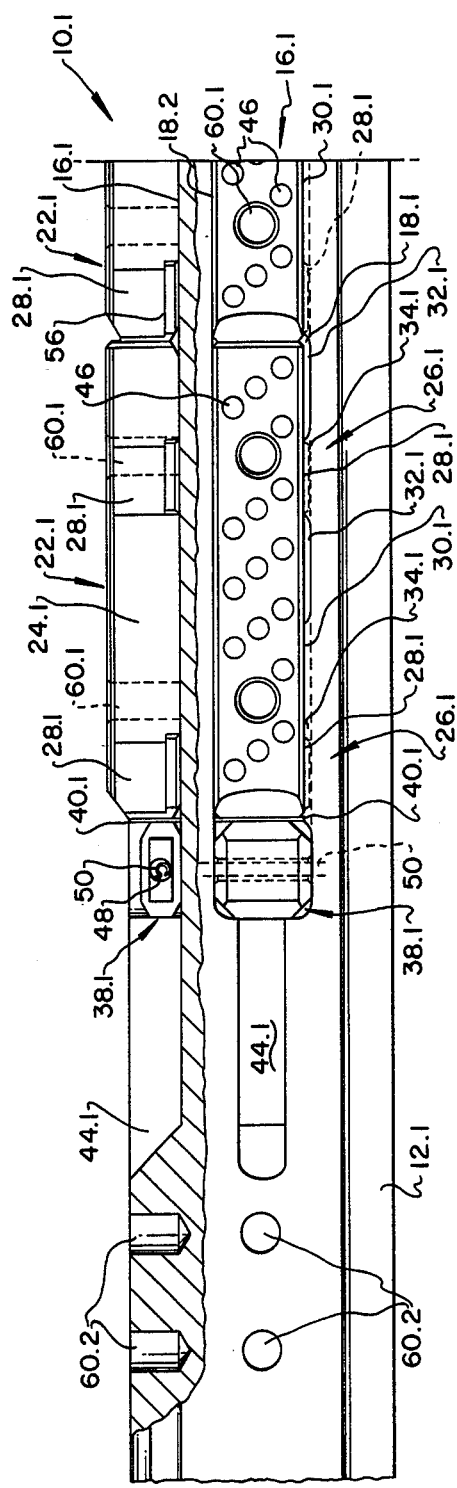
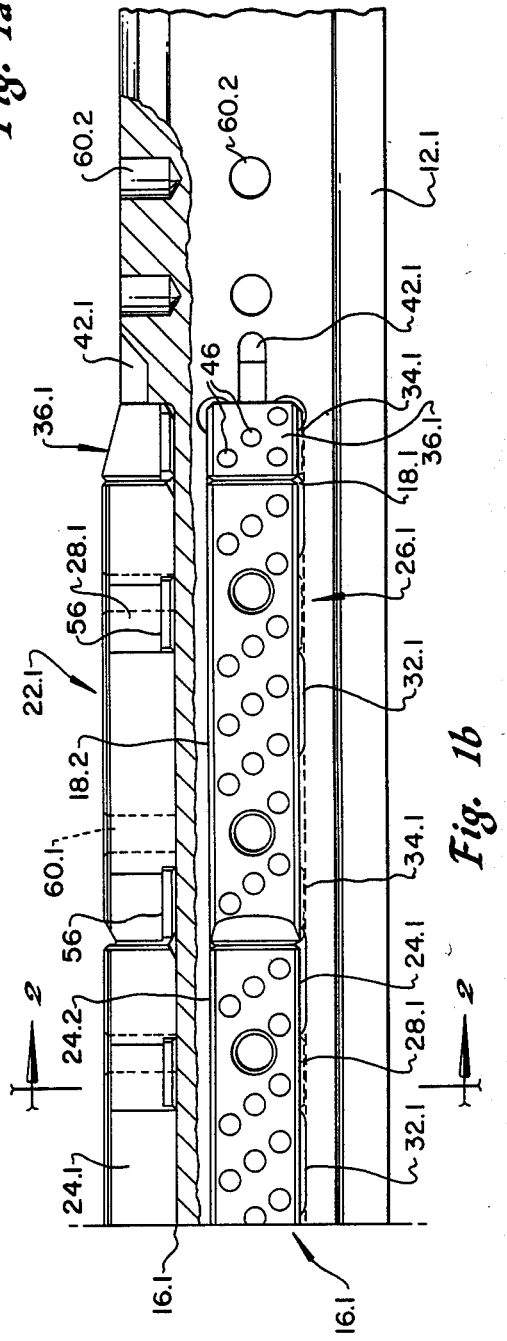
Fig. 1a
Fig. 1b

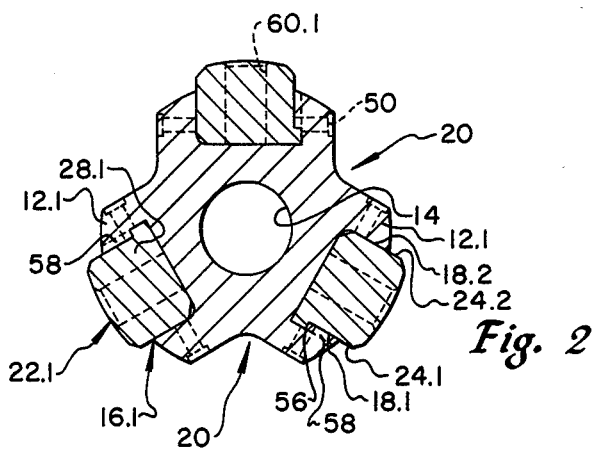
Fig. 2
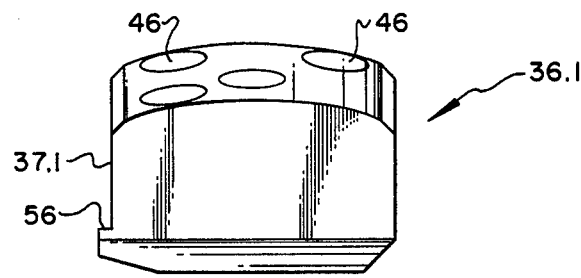
Fig. 5
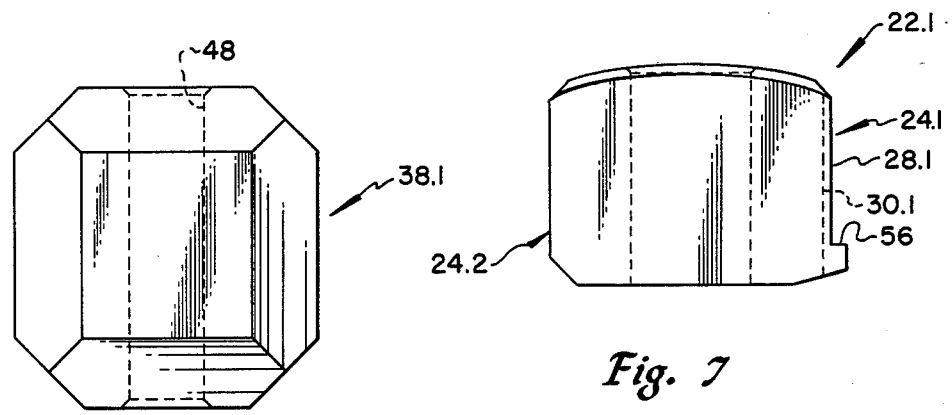
Fig. 6
Fig. 7

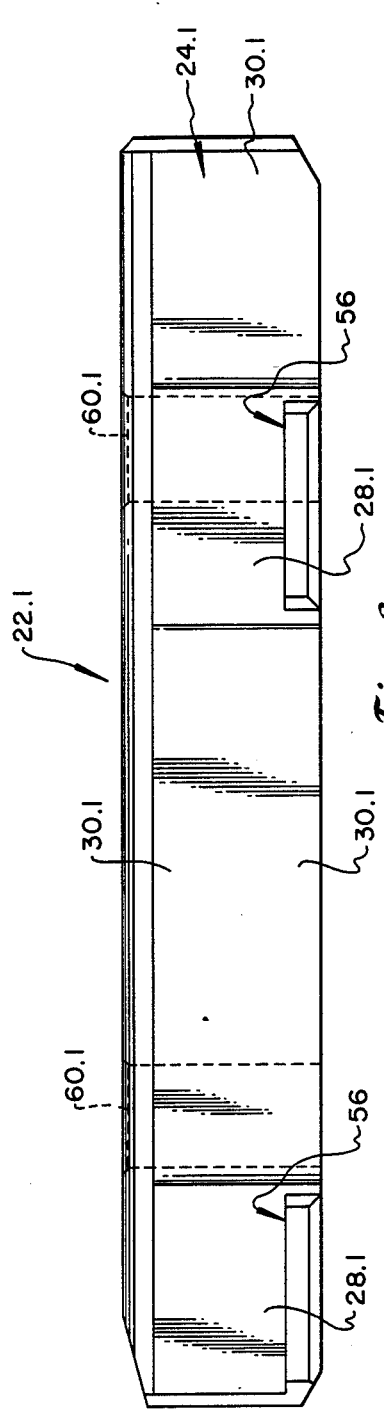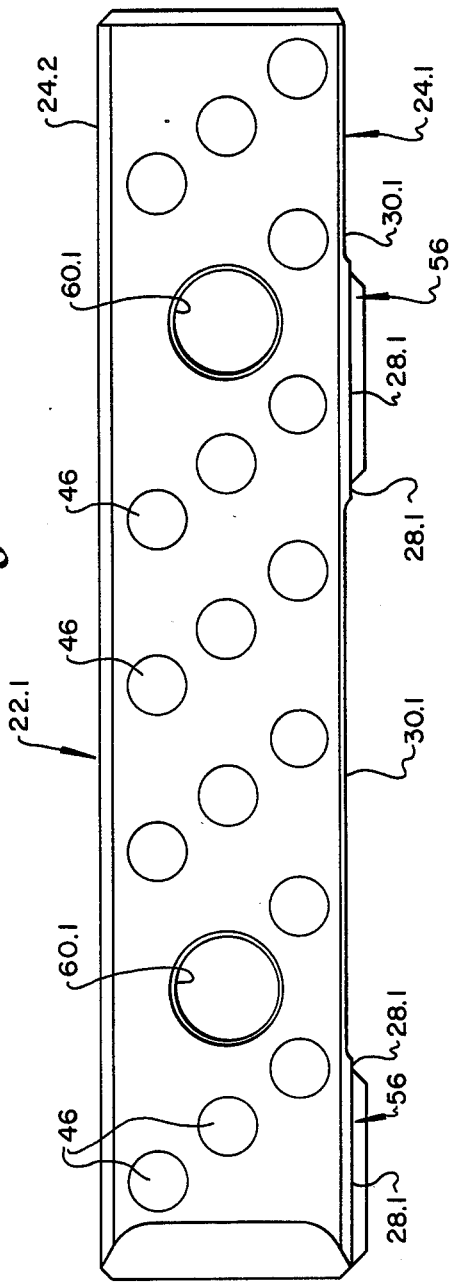

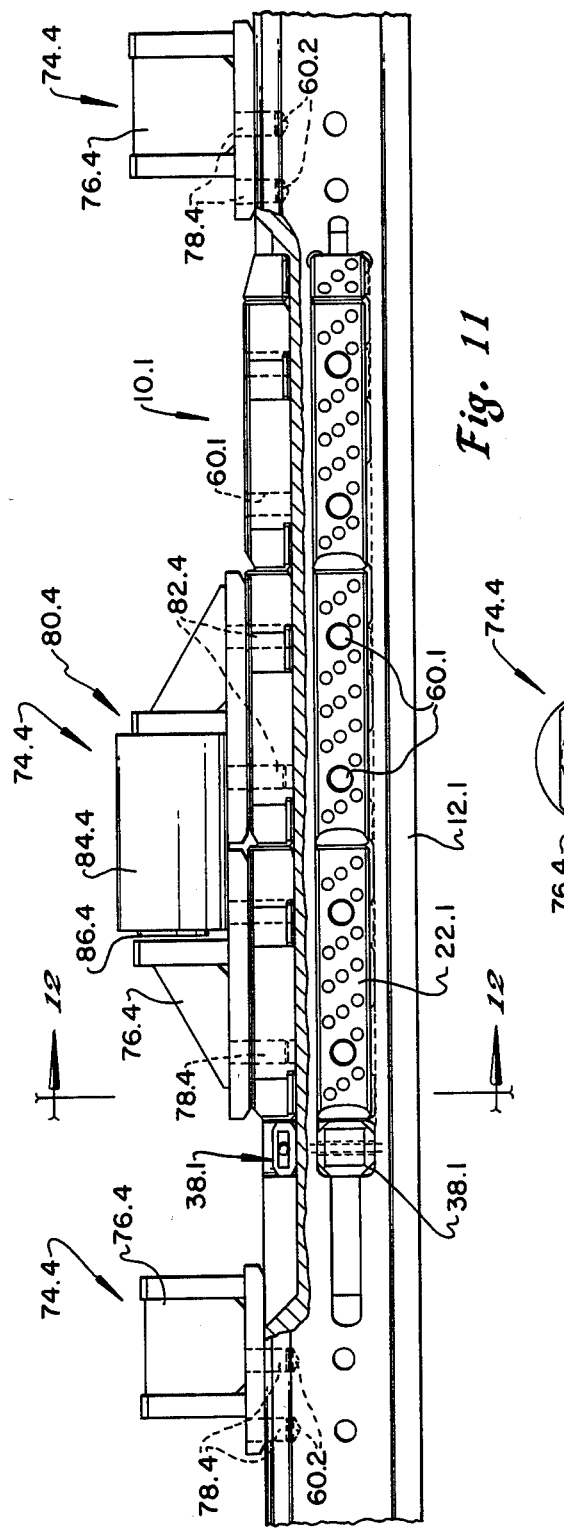
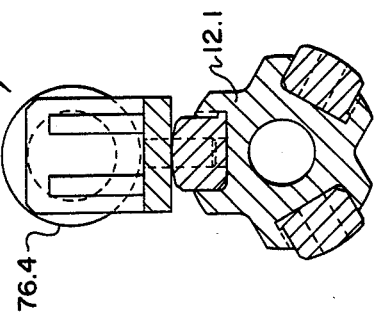

BOREHOLE CONDITIONING APPARATUS

This invention relates to borehole conditioning apparatus. More particularly, this invention relates to a borehole conditioning tool for use in a drilling operation to condition the borehole during drilling. The borehole conditioning tool of this invention may therefore be in the form of a stabilizer or centralizer which is used for deviation control and/or bit stabilization, in the form of a reamer for providing a reaming effect, or in the form of a combination tool which incorporates stabilizing wall contacting members or wall contacting members in the form of rotatably mounted cutters such as reamer cutters.

This invention is particularly concerned with borehole conditioning tools which utilize replaceable wall contacting members so that they can readily be replaced.

Various types of borehole conditioning tools are known. In some of the known tools replaceable wall contacting members are mounted in grooves in a conditioning tool by means of bolts, by means of studs or by means of locking pins. These systems present the disadvantage that the bolt, pin or stud zones tend to create zones of high stress which are subject to stress fracture during use. Other known conditioning tools utilize wedge shaped wall contacting members which are used in pairs and are axially displaced relatively to each other in the slots of such conditioning tool bodies to provide a wedging action for locating them in the slots. The wedging system suffers from the disadvantage that the members must be used in pairs, and from the disadvantage that substantial stress zones are again created at the leading and trailing ends of the wedge members frequently resulting in cracking of the tool body portion in these zones. This system provides the further disadvantage that accurate machining of the wall contacting members is necessary to provide the required wedging effect, and that additional locking means is essential to prevent the wedging effect from being released as a result of axially directed forces which arise during drilling operations.

The prior wedge systems present the further disadvantage that sledge hammers are required during assembly and disassembly to knock out the wedge wall contacting members. This presents a substantial risk of injury during use since a significant force is required. Occasionally, when normal disassembly is not possible, the tool must be heated to permit removal of blades. This presents additional hazards.

It is accordingly an object of this invention to provide a borehole conditioning tool which can overcome or at least reduce some of the disadvantages of the prior known systems.

In accordance with one aspect of this invention, there is provided a borehole conditioning tool suitable for use in a drill string, the tool comprising a tubular body portion having a plurality of elongated, circumferentially spaced retainer slots for housing wall contacting members, each retainer slot being defined by a pair of opposed elongated slot side walls, and a plurality of wall contacting members in the form of elongated stabilizer blades which are mounted in the retainer slots, each stabilizer blade having a pair of opposed blade side walls, the slit side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot.

The one blade side wall which is in engagement with the one slot side wall along the substantial or major proportion of the length of the blade will preferably be the wall which is on the trailing side in regard to the direction of rotation of the conditioning tool during use. This provides the advantage that there is a full bearing surface between the blade side wall and the slot side wall to effectively accommodate the forces which arise during use.

The opposed blade side wall may be in engagement with the opposed slot side wall along a portion of the length of the blade side wall of each stabilizer blade to provide a single interference zone. Such a single interference zone may be provided in a central zone of each stabilizer blade so that each stabilizer blade will have a recess zone or relief zone on opposed sides of the raised interference zone. Alternatively, if desired, the interference zone may be provided towards one end of each blade, and the recess zone may be provided along the remainder of the length of each blade.

In a presently preferred embodiment of the invention, the opposed blade side wall will be in engagement with the opposed slot side wall along a portion of the length of the blade side wall of each stabilizer blade, preferably in a plurality of spaced interference zones.

The interference zone or zones of each blade may conveniently comprise less than about 50% to 70% of the length of such blade. Preferably, however, the interference zones of each blade may comprise less than about 40% of the length of each blade, and conveniently between about 5% or less, and about 40% of the length of each blade.

Each interference zone may be provided by one blade side wall of each stabilizer blade having at least one recess zone which is recessed relatively to such interference zone to prevent frictional engagement between the slot side wall and such recessed zone.

In an alternative embodiment of the invention each interference zone may be provided by one slot side wall of each slot having at least one recess zone which is recessed relatively to such interference zone to prevent frictional engagement occurring between the blade side wall and such recessed zone.

In a presently preferred embodiment of the invention, each interference zone is preferably provided by one slot side wall of each slot having at least one slot recess zone which is recessed relatively to the remainder of the slot side wall, and by one blade side wall of each blade having at least one blade recess zone which is recessed relatively to the remainder of the blade side wall to prevent frictional engagement between the blade recess zones and the slot recess zones.

In the preferred embodiment of the invention, the blade and slot recess zones are preferably recessed sufficiently to prevent frictional engagement between a blade recess zone and a slot side wall interference zone when they are in axial alignment, and to prevent frictional engagement between a slot recess zone and a blade side wall interference zone when they are in axial alignment.

In this embodiment of the invention, the blade and slot recess and interference zones may preferably be positioned in a complementary spaced manner to allow each blade to be freely displaceable in a radial direction relatively to the tubular body portion when the interference zones of the blade and slot are not in axial alignment, and to frictionally locate the blade in the retainer slot when the blade and slot interference zones are in axial alignment.

Each retainer slot may be longer than each blade to allow the blades to be radially displaced relatively to the tubular body portion when the blade recess zones are in axial register with the slot interference zones, and to allow the blades to be axially displaced relatively to the slots to bring the blade and slot interference zones into and out of register with each other.

In an alternative embodiment of the invention, the slot side walls and blade side walls may be shaped so that for each blade only a portion, and preferably only a minor portion, of each blade side wall will be in engagement with the slot side wall to provide interference zones, and preferably short interference zones, on both sides of each blade which locate the blade in position in the retainer slot.

The borehole conditioning tool of this invention may include a plurality of nose blocks to provide protection for the stabilizer blades during use, with each nose block being mounted in one retainer slot preferably at the lower end of such slot which is closest to the end of the tool constituting its lower end during use, and each nose block having a tapered wear surface which is tapered inwardly in the direction of the end of the tool.

Each nose block is shaped to reduce undercutting of the stabilizer pads during use from abrasive cuttings which are flushed past the tool during use.

Each nose block is preferably an independent member which is independent of the stabilizer pad, and which can thus be replaced as an independent unit when required.

The tool of this invention may further include a plurality of filler blocks, each filler block being mounted in one retainer slot preferably at the upper end of such slot which is closest to the end of the tool constituting its upper end during use, to locate the stabilizer blades against axial displacement along the slots.

In an embodiment of the invention at least some of the filler blocks may comprise or include at least one adjustment shim which is jammed into position in the retainer slot to prevent axial displacement of the stabilizer blades in the slots.

A plurality of shims of differing thicknesses and/or shims which are bowed and are resiliently deflectable may be used to effectively take up any remaining space which is left in an elongated slot when the wall contacting members have been positioned in the slot.

A resiliently deflectable shim may be conveniently be in the form of a belleville type shim or the like.

The conditioning tool of this invention may include a plurality of key formations to prevent the stabilization blades from radial displacement out of the retainer slots even if the interference engagement between the blades and slots fail during handling, transportation, or use. The key formations may be integral with the blades or slots, or may comprise independent key members which can cooperate with the blades and slots to prevent radial dislodgment of the blades.

The conditioning tool of this invention may include a reamer section having wall contacting members in the form of reamer members which are mounted thereon.

The reamer section may be axially aligned with the stabilizer section, or may be axially spaced therefrom.

In an embodiment of the invention where a reamer section is spaced from the stabilizer section along the tubular body of the tool, reamer members in the form of rotatably mounted reamer cutters may conveniently be mounted in extensions of the elongated retainer slots. The extensions of the retainer slots may be widened to accommodate the conventional reamer shaft, reamer cutters which are rotatbly mounted on the reamer shaft and mounting means for mounting the reamer shafts in position in the slots. The mounting means may be in the form of bolts or studs or in the form of bearing blocks which are mounted in the slots.

The invention further extends to a borehole conditioning tool system comprising a tubular body portion as hereinbefore described, and at least one wall contacting member in the form of an elongated stabilizer blade as hereinbefore described, to be removably mounted in a retainer slot.

The invention further extends to a borehole conditioning tool suitable for use in a drill string, the tool comprising, a tubular body portion having a plurality of elongated, circumferentially spaced retainer slots for receiving wall contacting members in the form of elongated stabilizer blades, each retainer slot being defined by first and second opposed elongated slot side walls in which the first slot side wall is generally planar along the length of the slot, and in which the second slot side wall has a recessed portion which is recessed relatively to the remainder of that wall for the remainder to define at least one raised area to constitute an interference zone to provide a frictional interference fit for a stabilizer blade when positioned in the slot between the interference zone and the first slot side wall.

The invention further extends to a stabilizer blade to be mounted in an elongated slot of a borehole conditioning tool, the blade having first and second opposed elongated blade side walls, the first side wall being generally planar, and the second blade side wall having at least one recessed zone which is recessed relatively to the remainder of that blade side wall to define at least one raised area which constitutes an interference zone, whereby the blade may be mounted in a slot of such a borehole conditioning tool such that it will be held between opposed slot side walls defining the slot by such side walls forming a frictional interference fit with the first blade side wall and with the interference zone.

In accordance with yet a further aspect of the invention there is provided a borehole conditioning tool suitable for use in drilling operations, the tool comprising a body portion having a plurality of elongated circumferentially spaced retainer slots for housing wall contacting members, each retainer slot being defined by a pair of opposed elongated slot side walls in which at least one of the walls has a plurality of recess zones at spaced intervals along its length for the remainder to define a plurality of raised areas which constitute interference zones at spaced intervals along the length of the slot; and a plurality of elongated wall contacting members to be mounted along the length of each slot, each wall contacting member having a pair of opposed member side walls in which at least one member side wall has at least one recess zone and at least one raised zone which constitutes at least one interference zone, the recess and interference zones of each member being arranged to correspond with the spacing of the recess and interference zones of the slot side walls thereby allowing a wall contacting member to be freely displaceable in a radial direction when positioned so that its interference and recess zones are in alignment with recess and interference zones respectively of a slot, but to be frictionally located in a slot when positioned therein with an interference zone of the member in alignment with an interference zone of the slot side wall to provide an interference fit. The wall contacting members of this aspect of the invention may be in the form of reamer cutter members, in the form of centralizer members, or in the form of stationary or rotatable stabilizer blade members, all of which are replaceable to allow for replacement when required. All of these wall contacting members may be of conventional type except for the side wall configurations which are required in the context of this invention.

In an embodiment of this aspect of the invention, each wall contacting member may have a displacement formation provided therein, and the tubular body may have corresponding displacement formations provided proximate each retainer slot, the displacement formations being engagable by engagement formations of a displacement apparatus to allow the wall contacting members to be displaced in an axial direction along the length of a slot for engaging or releasing corresponding interference zones.

In a presently preferred embodiment of the invention, the displacement formations may comprise pairs of displacement bores which are provided in the wall contacting members to extend transversely to their length, and which are provided in the tubular body proximate the ends of each retainer slot to extend radially relatively to the body.

In accordance with yet a further aspect of the invention, there is provided a borehole conditioning tool suitable for use in a drill string, the tool comprising, a tubular body portion having a plurality of elongated, circumferentially spaced retainer slots for housing wall contacting members, each retainer slot being defined by a pair of opposed elongated slot side walls; a plurality of wall contacting members to be removably mounted in the retainer slots for conditioning the walls of a borehole during use; and a plurality of nose blocks which are to be mounted in the slots with one nose block at the leading end of each slot, each nose block having a tapered wear surface which tapers outwardly towards a trailing end of the nose block for the nose blocks to provide protection for the wall contacting members against undercutting during use.

The invention further extends to displacement apparatus for use in displacing a wall contacting member axially along an elongated retainer slot of a borehole conditioning tool as described, the apparatus comprising an anchor member having engagement formation means for engagement with at least one displacement formation of a wall contacting member of the tool; and a displacement member having engagement formation means for engagement with at least one displacement formation of a wall contacting member or of the tool, and having ram means which is displaceable relatively to the member to provide a displacement force; the anchor member and displacement member being adapted to be mounted in position with their engagement formation means in engagement with separate components of the tool, and the displacement member being adapted to be actuated for the ram means to be displaced to engage with the anchor member and provide a displacement force for displacing the anchor member and the displacement member relatively to each other and thus the separate components relatively to each other in the axial direction along a retainer slot.

The conditioning tool, components of the tool, and the displacement apparatus in accordance with this invention may be made of any conventional materials which are utilized for such tools, components and apparatus.

The borehole conditioning tool of this invention may be a relatively short tool having an effective wall contacting length of, for example, 1 foot, 2 feet or 3 feet. However, if desired, the conditioning tool of this invention may be an elongated tool which may have a length of say about 30 feet, and which may have one or more conditioning sections of varying lengths. In one embodiment of the invention, the conditioning tool may have a length of about 30 feet and may have, for example, a 9-foot length of wall contacting members in each retainer slot. The wall contacting members of each slot may be arranged in one length or in axially spaced groups.

Embodiments of the invention are now described by way of example with reference to the accompanying drawings.

In the drawings:

FIGS. 1A and 1B show a fragmentary partly sectional side elevation of one embodiment of a borehole conditioning tool in accordance with this invention;

FIG. 2 shows a diagrammatic cross-sectional view of the tool of FIG. 1 to illustrate the assembly of components;

FIGS. 3 and 4 show, to an enlarged scale, a side elevation and a plan view of the wall contacting members in the form of removable stabilizer blades of the borehole conditioning tool of FIGS. 1 and 2;

FIG. 5 shows, to an enlarged scale, a front view of a nose block;

FIG. 6 shows, to an enlarged scale, a plan view of a filler block used in the borehole conditioning tool of FIG. 1;

FIG. 7 shows, on the same scale as FIGS. 3 and 4, a cross sectional view of a wall contacting member in the form of a stabilizer blade;

FIG. 11 shows a fragmentary side elevation of a borehole conditioning tool corresponding substantially with the tool of FIG. 1, but including displacement apparatus for displacing the components of the tool during assembly or during disassembly;

FIG. 12 shows a diagramatic cross sectional view of the tool and displacement apparatus of FIG. 11, along the line XII—XII;

Figure 8:
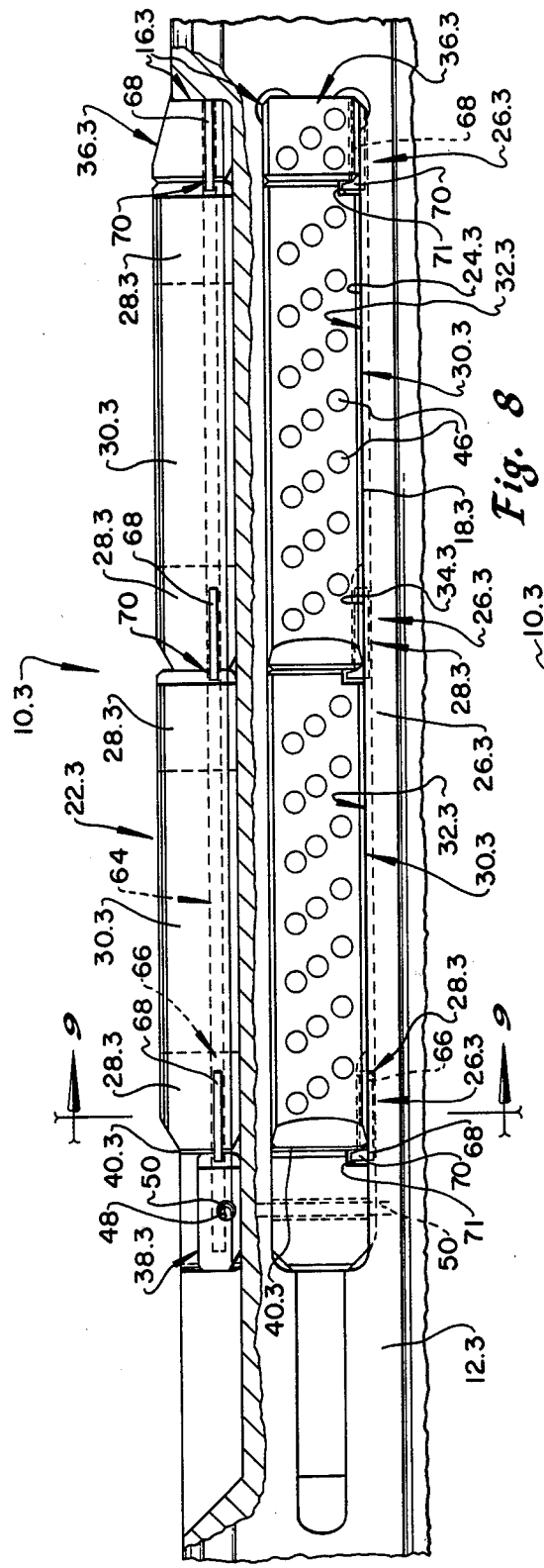
FIG. 8 shows a fragmentary, side elevation of an alternative embodiment of a borehole conditioning tool in accordance with this invention.

With reference to FIGS. 1-7 of the drawings, reference numeral 10.1 refers generally to a borehole conditioning tool in the form of a stabilizer which is suitable for use in a drill string.

The borehole conditioning tool 10.1 comprises a tubular body portion 12.1 having a bore 14 therein to form part of the drill string flow passage during use.

The tubular body portion 12.1 has conventional coupling means (not shown) at its opposed ends for coupling the tool 10.1 into a drill string. The coupling means typically comprises a tool joint in the form of threaded socket or box joint at one end, and a tool joint in the form of a threaded spigot or pin joint at the opposed end.

The tubular body portion 12.1 has a plurality of elongated, circumferentially spaced retainer slots 16.1 provided therein for housing wall contacting members, each retainer slot 16.1 being defined by a pair of opposed elongated slot side walls in the form of a leading slot side wall 18.1 and a trailing slot side wall 18.2.

The leading slot side wall 18.1 is on the side which would constitute the leading side during rotation of the tubular body portion 12.1 in a clockwise direction during use when viewed downwardly into a borehole being drilled.

The tubular body portion 12.1 is shaped to define V-section grooves 20 along the length of the body portion 12.1 between adjacent pairs of retainer slots 16.1.

These V-section grooves 20 increase the annular area between the tubular body portion 12.1 and a borehole being drilled to allow cuttings to come out more readily and flow past the tubular body portion 12.1 up the annulus of the borehole. Other configurations such as flats or radii may be used to increase flow area.

The borehole conditioning tool 10.1 further comprises a plurality of wall contacting members in the form of elongated stabilizer blades 22.1 which are removably mounted in the retainer slots 16.1. Each stabilizer blade 22.1 has a pair of opposed blade side walls comprising a first or leading side wall 24.1 and a second or trailing side wall 24.2.

The trailing slot side walls 18.2 of the retainer slots 16.1 are shaped so that they are substantially planar along the entire length of the retainer slots 16.1.

The trailing side walls 24.2 of the stabilizer blades 22.1 are likewise shaped so that they are substantially planar throughout their lengths.

Thus, when the stabilizer blades 22.1 are located in the retainer slots 16.1 in the tool 10.1 as shown in FIGS. 1 and 2 of the drawings, substantially planar trailing side walls 24.2 of the stabilizer blades 22.1 will be in engagement with the substantially planar trailing slot side walls 18.2 to give a full surface bearing contact between these walls. Since these walls are on the trailing side of the stabilizer blades 22.1 during clockwise rotation of the tool 10.1 in use, this planar engagement is advantageous in that the full bearing surface which is provided helps to stabilize the stabilizer blades 22.1 during use and helps to dissipate stress thereby providing improved resistance to high stress zones being created, and to the development of stress cracks either in the stabilizer blades 22.1 or in the body portion 12.1 during use.

In contrast with the extended surface contact between the trailing blade side walls 24.2 and the trailing slot side walls 18.2, the leading blade side walls 24.1 of the blade are in frictional engagement with the leading slot side walls 18.1 of the retainer slots 16.1 only in relatively smaller interference zones 26.1 at spaced intervals along the length of the retainer slots 16.1.

An alternate to the preferred configuration, the leading and trailing side walls of the blades and slots can be reversed with respect to the above description. The trailing blade side walls may be in frictional engagement with the trailing slot side walls only in relatively smaller interference zones at spaced intervals. In yet another alternative, the trailing side walls of the blade and slot can be made similar to the leading side walls, that is, keys may be provided on either or both of the trailing or leading side walls.

The interference zones 26.1 are provided by each stabilizer blade 22.1 having portions of the leading blade side wall 24.1 recessed relatively to the remainder of the leading blade side wall 24.1 to thereby leave two relatively smaller raised areas 28.1 which constitute blade interference zones 28.1 of the stabilizer blades 22.1.

Each stabilizer blade 22.1 therefore has two blade interference zones 28.1 at spaced intervals along its length, with the remainder of the leading blade side walls 24.1 constituting blade recess zones 30.1. The two interference zones 28.1 of each blade 22.1 together comprise between about 5% and about 45%, and preferably about 30% of the surface area of the leading blade side wall 24.1 of each blade.

The interference zones 26.1 are further constituted by each leading slot side wall 18.1 of each retainer slot 16.1 having a plurality of axially spaced slot recess zones 32.1 which are recessed relatively to the remainder of the leading slot side walls 18.1 thereby leaving raised zones 34.1 which constitute slot interference zones 34.1.

The slot recess zones 32.1 are arranged so that the slot interference zones 34.1 are provided at spaced intervals along the length of the retainer slots 16.1, with the intervals corresponding with the intervals between the blade interference zones 28.1 of the blades 22.1.

Each retainer slot 16.1 has a lower end portion for a nose block 36.1, and has an upper end portion for a filler block 38.1. As an alternate to the preferred design, the nose and filler blocks can be reversed in location. The filler block could be located at the lower end. In yet another alternative, the filler block could be located anywhere along the slot.

The lower end of each retainer slot 16.1 wherein the nose block 36.1 is mounted, has a corresponding interference zone 34.1 to cooperate with an interference zone 37.1 of the nose block 36.1 as can be seen particularly in FIG. 5.

Because of the lower and upper end portions of the retainer slot 16.1 wherein the nose blocks 36.1 and filler blocks 38.1 respectively are positioned, the retainer slots 16.1 are longer than the three stabilizer blades 22.1 which are mounted in the retainer slots 16.1.

The interference zones 34.1 are arranged so that one nose block 36.1 can be freely displaced in a radial direction relatively to the body portion 12.1 when it is in line with a slot recess zone 32.1 on the leading side of the lower end portion of a retainer slot 16.1. In this position, therefore, with the interference zone 37.1 of the nose block 36.1 in alignment with the slot recess zone 32.1, the nose block can be freely displaced in a radial direction either to insert the nose block 36.1 into a retainer slot 16.1 or to remove the nose block therefrom.

When the nose block has been inserted into a retainer slot 16.1, it can be displaced axially by the exercise of force towards the lower end of the retainer slot 16.1 until it is in the lower end portion of the retainer slot 16.1 as shown in FIG. 1 of the drawing. In this position the interference zone 37.1 of the nose block 36.1 forms an interference fit with the slot interference zones 34.1 in the lower end portion of the retainer slot 16.1 thereby frictionally locating the nose block 36.1 in position in the slot.

In the same manner, because of the spacing of the slot recess zones 32.1 and slot interference zones 34.1, each of the stabilizer blades 22.1 can, when its interference zones 28.1 are aligned with slot recess zones 32.1, be freely displaced in a radial direction either into a retainer slot 16.1 or out of a retainer slot 16.1.

When a stabilizer blade has been dropped radially into a retainer slot 16.1, it can then be axially displaced (usually in the direction of the lower end of the body portion 12.1) until its interference zones 28.1 are in alignment or in register with two slot interference zones 34.1 thereby providing a frictional or interference engagement between such stabilizer blade 22.1 and the slot interference zones 34.1 on one side and the trailing slot side wall 18.2 on the opposed side.

In use, therefore, for assembly of the tool 10.1, in each retainer slot 16.1, a nose block 36.1 can first be dropped in, whereafter, on its upper side, three stabilizer blades can be dropped into position. Thereafter, the stabilizer blades can be displaced axially either simultaneously or one by one downward in the body portion 12.1 until the nose block 36.1 abuts the lower end of the retainer slot 16.1, until the first stabilizer blade 22.1 abuts the nose block 36.1, until the next stabilizer blade is in abutment with that blade, and until the last stabilizer blade is in abutment with the middle stabilizer blade.

In this position a space is left at the upper end of the retainer slot for accommodating a filler block 38.1 and usually one or more shims 40.1 as described below.

A removal slot 42.1 is provided to attend from the lower end of each retainer slot 16.1. A punch can be inserted into a removal slot 42.1, and can be hammered to displace a nose block 36.1 out of its frictionally located position until the cooperating interference zones have been moved out of alignment with each other, thereby allowing for removal of a nose block 36.1.

The body portion 12.1 further includes a lever slot 44.1 which extends from the upper end of each retainer slot 16.1. A lever can be inserted into a lever slot 44.1 for levering out a filler block 38.1 when required.

The slot interference zones 34.1, stabilizer blade interference zones 28.1 and nose block interference zones 37.1 are preferably machined to provide an interference of between about 2 and 5 thousandths of an inch to insure that each nose block 36.1 and each stabilizer blade 22.1 is securely held in position in each slot 16.1 in a frictional interference fit so that the nose blocks 36.1 and stabilizer blades 22.1 will not tend to become dislodged during handling or during use.

The large slot recess zones 32.1 and large blade recess zones 30.1 provide a number of advantages. These include, inter alia, the following:

(a) Because the interference zones 34.1 and 28.1 are relatively small surface areas, they can be machined accurately at relatively low cost. A more exact and specific degree of interference can therefore be achieved at relatively low cost. The slot recess zones 32.1 and blade recess zones 30.1, since they do not make contact with each other and do not make contact with the interference zones 28.1 and 34.1, may be roughly formed thereby substantially reducing costs.

(b) Because the interference zones 34.1 and 28.1 are relatively small, the probability of microscopic high spots on these zones will be lower. There will therefore be a greater probability of a more even loading and therefore a lesser probability of extremely high localized stress areas which can lead to weakness and fracture.

(c) Because of the large recess zones, stresses which are created in the interference zones 34.1, 28.1 and 37.1, can be dissipated more effectively.

(d) Because of the complementary arrangement of the interference zones 34.1 and the interference zones 28.1 and 37.1, the stabilizer blades 22.1 and nose blocks 36.1 can be freely displaced in the radial direction to either insert them into the retainer slots 16.1, or remove them therefrom. In addition, they can be displaced in the axial direction either to engage them or to disengage them.

(e) Because of the relatively small area of the interference zones 28.1 and 34.1 they can be engaged and disengaged by applying a relatively lower force in the axial direction than would be the case where there is full surface interference. In addition, the extent of deformation during engagement will tend to be reduced in comparison with the extent of deformation which would normally be expected with full surface interference.

While the stabilizer blades 22.1 may be machined, they could also be cast or forged and then finished purely with a clean-up cut. The blade interference zones 28.1 would, however, tend to be more acurately machined to provide a specific degree of interference, and to reduce the probability of microscopic high spots.

The nose blocks 36.1 and filler blocks 38.1 may be formed in the same way.

The body 12.1 would be machined in accordance with conventional techniques.

In the embodiment illustrated in FIG. 1, each blade 22.1 has a length of one foot thereby providing 3 feet of stabilization for the tool 10.1. The tool 10.1 may, however, be made of the same length with only 2 foot or only 1 foot of stabilization, may be made shorter with a reduced length of stabilization, or may be made longer as hereinbefore described.

The body portion 12.1, the blades 22.1, the nose blocks 36.1, the filler blocks 38.1 and the shims 40.1 may be made of any conventional material. Thus, for example, they may be made of any of the AISI 4140 to 4145 steel alloys.

As is conventional, each stabilizer blade 22.1 is provided with wear resistant inserts 46 such as, for example, tungsten carbide inserts, chrome carbide inserts, or the like across its exposed wear surface. Similar inserts 46 are also provided across the wear surfaces of the nose blocks 36.1.

Alternatively or additionally the wear surface of each blade or block may be provided with other means for reducing wear such as hard metal applications, carburizing, and case hardening for example.

Each nose block 36.1 is an independent block which has a tapered outer surface which is tapered outwardly in the direction of the upper end of the tool 10.1.

The nose blocks 36.1 prevent undercutting of the stabilizer blades 22.1. The nose blocks 36.1 further tend to provide some protection for the body portion 12.1 against cuttings which flush past during use.

By having separate and independent nose blocks 36.1, they can be replaced independently when required. This is a distinct advantage since the nose blocks tend to wear more rapidly than the stabilizer blades 22.1.

Each filler block 38.1 is designed to be inserted last and removed first, and is designed to locate the nose blocks 36.1 and stabilizer blades 22.1 in position in the retainer slots 16.1 against axial displacement during use.

Each filler block 38.1 has tapered upper and lower inner and outer edges to permit it to be placed in position at an acute angle to the axis of the tubular body portion 12.1, and then to be forced downwardly at its upper end until it is parallel to the axis of the body portion 12.1 and seats on the base of the retainer slot 16.1. Such pivotal displacement assists in providing automatic axial compression of the components in the retainer slots 16.1.

The tapered surfaces on the inner upper side further allow a lever to be inserted into a lever slot 44.1 for levering such filler blocks 38.1 out of the retainer slots 16.1 when required.

Each filler block 38.1 has a security bore 48 for receiving a security pin 50 as shown in FIGS. 1 and 2. The security pin 50 further extends through bores in the body portion 12 which are in line with the security bore 48 when the filler block 38.1 is located in position. The security pin is inserted purely as security since the forces applied to the filler blocks 38.1 during use will tend to insure that they remain securely in place.

Alternatively, for example, a filler block may be bolted to a tapped hole in the body or may be secured by the interference fit only.

In practice the stabilizer blades 22.1 may be manufactured so that they will, even when a tolerance stack up has occurred, be slightly shorter than required. For this reason the shims 40.1 are utilized to take up the remaining gap which would otherwise remain. The shims 40.1 have a shape corresponding to the section of the stabilizer blades 22.1. The shims 40.1 may be in the form of relatively thin metal sheets so that one or several shims may be used between each filler block 38.1 and an adjacent stabilizer pad 22.1, as may be required.

In an embodiment of the invention the shims 40.1 may be in the form of resiliently bendable shims in the form of belleville type springs so that a single compressed shim can, as shown in FIG. 1, be used between each filler block 38.1 and the adjacent stabilizer blade 22.1 and yet take up whatever gap remains.

Each stabilizer blade 22.1 may have its lower face in the zones between the interference zones 28.1, partially hollowed out to reduce its weight. This can be done to reduce the cost of the stabilizer blade. This will not affect the performance of the blades 22.1 since, in the zones where they are of reduced section, there is no interference compression of the blades 22.1 between the interference zones 34.1 and the opposed trailing slot walls 18.2.

The borehole conditioning tool 10.1 further includes a plurality of key formations to prevent the stabilization blades 22.1 from radial displacement or dislodgment out of the retainer slots 16.1 even if the interference engagements between the blades and slots fail once deformation has occurred during use or when the tool is subjected to a severe impact in the radial direction.

In the embodiment shown in FIGS. 1-7 of the drawings the key formations are provided by complementary mating flanges 56 and 58 of the blades 22.1 and slot side walls 18.1 respectively. The nose blocks 36.1 have corresponding mating flanges 56. The flanges are integral with the blades 22.1 and slot side walls 18.1 respectively.

The complementary mating flanges 58 of the slot side walls 18.1 are provided by raised flanges which constitute the slot interference zones 34.1.

As the nose blocks 36.1 or stabilizer blades 22.1 are displaced axially into their operative positions, the complementary flanges 56 and 58 will overlap to positively prevent any radial displacement of the nose blocks 36.1 or stabilizer blades 22.1 out of their operative positions. However, because of their spacing, they will not interfere with radial movement or insertion of the blades 22.1 or nose blocks 36.1 when they are in positions where there interference zones 28.1 or 37.1 as the case may be, are out of register with the interference zones 34.1.

Each of the stabilizer blades 22.1 has a pair of displacement formations in the form of displacement bores 60.1 provided therein. The tubular body portion 12.1 has corresponding displacement formations in the form of displacement bores 60.2 provided beyond the lower end and beyond the upper end of each retainer slot 16.1.

The displacement bores 60.1 and the displacement bores 60.2 are utilized for displacing the stabilizer blades 22.1 by means of displacement apparatus as hereinafter described with reference to FIGS. 11-16 of the drawings.

Figure 9:
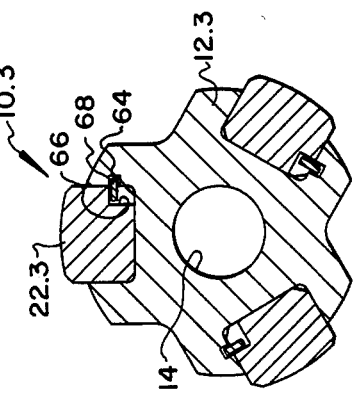
FIG. 9 shows a fragmentary cross sectional view of the tool of FIG. 8.

With reference to FIGS. 8 and 9 of the drawings, reference numeral 10.3 refers generally to an alternative embodiment of a borehole conditioning tool in accordance with this invention.

The borehole conditioning tool 10.3 corresponds substantially with the borehole conditioning tool 10.1. Corresponding parts are therefore indicated by corresponding reference numerals except that the suffix ".1" has been replaced by the suffix ".3". In the borehold conditioning tool 10.3 interference zones 26.3 are provided at opposed ends of each of the stabilizer blades 22.3.

The interference zones 26.3 are provided by each stabilizer blade 22.3 having its leading blade side wall 24.3 recessed along its entire central zone to provide a recess zone 30.3, and to provide raised zones 28.3 which constitute blade interference zones 28.3.

The blade interference zones 28.3 of each blade may together constitute between about 5% or less and about 50 or 60% of the surface area of the blade side wall on which they are provided. In the illustrated embodiment they together constitute about 30% of the surface area.

The interference zones 26.3 have further been formed by the leading slot side wall 18.3 of each retainer slot 16.3 being recessed along substantial portions which are at spaced intervals along the lengths of the slot side wall 18.3 to provide slot recess zones 32.3, and to provide raised zones 34.3 which are raised relatively to the recess zones 32.3 and constitute slot interference zones 34.3.

Thus, as illustrated in FIG. 8 of the drawings, when the stabilizer blades 22.3 are positioned in their correct operative position, the blade interference zone 28.3 are in alignment with the slot interference zones 34.3, with the result that each blade 22.3 is frictionally located in its retainer slot 16.3 by means of an interference fit in the interference zones 26.3.

In this embodiment of FIGS. 8 and 9, each stabilizer blade 22.3 may be inserted into position in a retainer slot 16.3 in accordance with several alternative modes.

The first mode is the mode already described with reference to the previous drawing. In accordance with this mode, a stabilizer blade would be dropped into a retainer slot 16.3 in a position where the interference zones 28.3 are out of alignment with the slot interference zones 34.3 Thereafter the blade 22.3 will be displaced axially along the retainer slot 16.3 until the blade is in its operative position with the blade friction zones 28.3 in interference engagement and in alignment with the slot interference zones 34.3.

In accordance with a second mode of assembly, each stabilizer blade 22.3 may be placed on the retainer slot with the interference zones 28.3 in perfect alignment with the interference zones 34.3. In this position, such a stabilizer blade can be hammered radially by means of a sledge hammer until it is located in its operative position in contact with the base of the retainer slot 16.3.

Because the interference zones 26.3 constitute a minor proportion of the blade side walls 24.3, all the advantages already described with reference to the previous embodiment of the conditioning tool 10.1, apply. In addition, however, the tool 10.3 provides the advantage that, even if apparatus for displacing the blades 22.3 axially along the retainer slot 16.3 is not available, the blades 22.3 can be inserted into position by hammering them in the radial direction.

Because of the relatively small surface areas of interference, such radial hammering can usually be achieved without excessive peening and without an excessive tendency for the stabilizer blades to become bowed in their central zone during insertion. A correspondingly lower force will of course be required than would be the case where there is full surface interference.

The stabilizer blades can be levered out in the radial direction if there is no apparatus available for axial displacement of the blades into a non-interference position.

The borehole conditioning tool 10.3 further differs from the borehole conditioning tool 10.1 insofar as the key formations are concerned.

In the borehole conditioning tool 10.3, the key formations are provided by corresponding grooves 64 and 66 which are provided in the leading slot side walls 18.3 in spaced zones or along their entire lengths, and in the leading blade side walls 24.3 preferably, but not necessarily only, in the region of the trailing interference zones 28.3 of each stabilizer blade 22.3.

A corresponding groove 66 is provided in the leading side wall of each nose block 36.3.

The key formations further comprise key members 68 which are removably located in the grooves 64 and 66 to locate the nose blocks 36.3 and stabilizer blades 22.3 against radial displacement out of the retainer slots 16.3.

Each key member 68 has a length slightly less than the length of the grooves 66, and has a transversely extending head portion 70 to facilitate removal of a key member 68.

Each stabilizer blade 22.3 and the filler block 38.3 has a recess 71 to accommodate the head portion 70.

Thus as each successive stabilizer blade 22.3 or filler block 38.3 is inserted into position once a key member 68 has been inserted into position, a shoulder portion below each recess 71 will enter below the head portion 70 of the key member 68, and the head portion will be visible from above in the recess 71. The tool 10.3 can therefore be visually checked to see that the key members 68 are in place.

The key members 68 will thus serve to hold both the upper and lower ends of adjacent components against radial dislodgment out of the retainer slots 16.3.

In accordance with a third mode, each stabilizer blade 22.3 and the filler block 38.3 has a recess through the height of the blade to accommodate the head portion 70 and allow radial (hammer) installation and removal.

Thus as each successive stabilizer blade 22.3 or filler block 38.3 is inserted into position the head portion will be visible from above in the recess 71. The tool 10.3 can therefore be visually checked to see that the key members 68 are in place.

The key members 68 will thus serve to hold the upper ends of adjacent components against radial dislodgment out of the retainer slots 16.3.

Figure 10A:
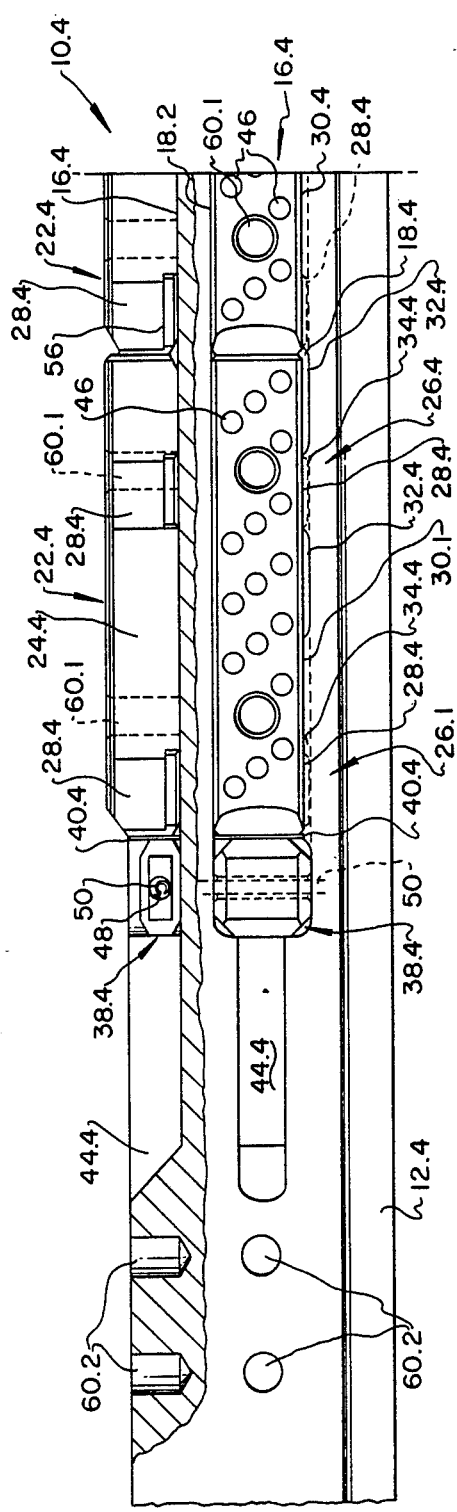
FIGS. 10A and 10B show a fragmentary view of a borehole conditioning tool in accordance with this invention, including a reamer section.
Figure 10B:
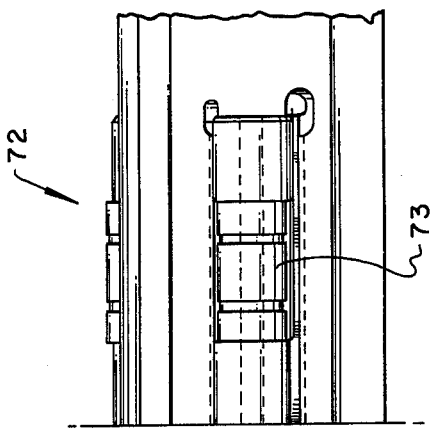
Figure 13:
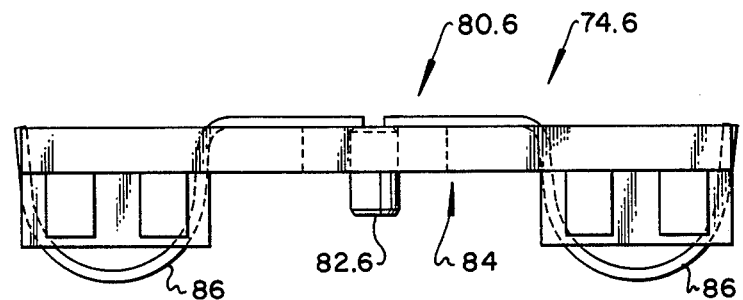
FIG. 13 shows a diagrammatic end elevation of an alternative embodiment of displacement apparatus in accordance with this invention.
Figure 14:
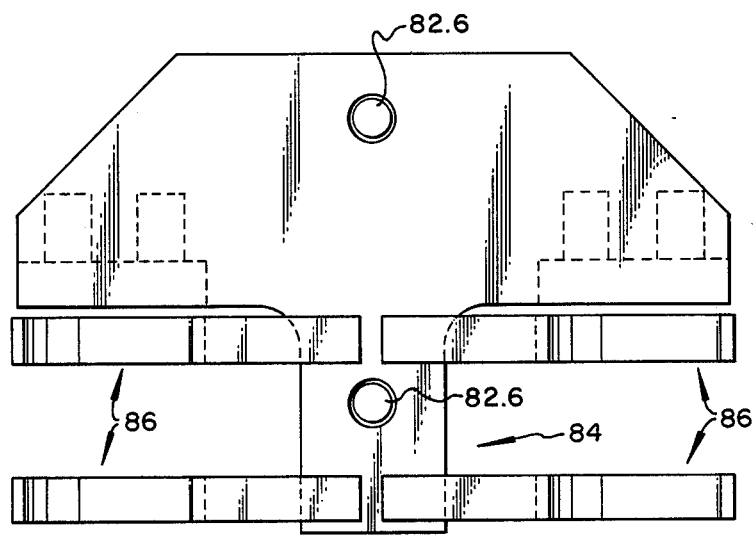
FIG. 14 shows a plan view of the apparatus of FIG. 13.

With reference to FIG. 10 of the drawings, reference numeral 10.4 refers generally to a borehole conditioning tool corresponding to the tool 10.1, except that it includes a reamer section 72 adjacent the stabilizer section where the stabilizer blades 22.1 are provided.

The reamer section 72 is of conventional type, and has reamer cutters 73 mounted in the extensions of the retainer slots 16.4.

As can be seen in the previous figures of drawings, and in FIG. 10, each of the retainer slots 16 has circular cut out portions at the corners to prevent areas of high stress arising where fractures can occur.

With reference to FIGS. 11 and 12 of the drawings, the borehole conditioning tool 10.1 of FIGS. 1-7 is illustrated in these drawings with displacement apparatus 74.4 shown in position thereon for use in displacing the stabilizer blades 22.1 axially along the retainer slots 16.1 into or out of their operative positions.

The displacement apparatus 74.4 comprises anchor members 76.4, each anchor member 76.4 having engagement formation means in the form of anchor pins 78.4 which are removably engaged in the displacement bores 60.1 or 60.2, as the case may be.

The displacement apparatus 74.4 further comprises a displacement member 80.4 having engagement formation means in the form of anchor pins 82.4 which are removably engaged in the displacement bores 60.1 of one of the centrally positioned stabilizer blades 22.1.

The displacement member 80.4 has a hydraulic ram 84.4 which can be hydraulically actuated to displace a plunger 86.4 relatively thereto. Alternatively, a jack screw apparatus or other such power device may be used to displace such a plunger type device or other member relatively thereto.

In the embodiment shown in FIGS. 11 and 12, once the filler block 38.1 has been removed, the ram 84.4 can be actuated for the plunger 86.4 to abut the anchor member 76.4 which is connected to the upper stabilizer blade 22.1, and then to displace the upper stabilizer blade 22.1 axially into its inoperative position where it can be removed. Thus by using the ram 84.4 and the anchor members 76.4 which are either connected to a stabilizer blade or connected to the body portion 12.1, stabilizer blades 22.1 can be displaced axially into and out of their operative positions for assembly or disassembly when replacement is necessary.

With reference to FIGS. 13-16 of the drawings, reference numeral 74.6 refers generally to an alternative embodiment of displacement apparatus in accordance with this invention for displacement of the stabilizer blades 22.1 during assembly or during disassembly.

The displacement apparatus 74.6 comprises a cradle member 80.6 having a central locating portion 84 wherein a pair of anchor pins 82.6 are mounted, and having a cradle formation 86 on either side of the central portion 84.

Each cradle formation 86 is shaped to hold a hydraulic ram (not shown).

The cradle formations 86 are positioned relatively to the central locating portion 84 so that the ram members will provide their displacement force approximately along the plane of the center line of a stabilizer blade when the displacement apparatus 74.6 is located in position on the tool 10.1 with the anchor pins 82.6 engaged with displacement bores 60.1.

This will insure that when the displacement rams in the cradle formations 86 are actuated, the stabilizer blades 22.1 will be displaced smoothly along the retainer slots without any significant turning moment.

Figure 15:
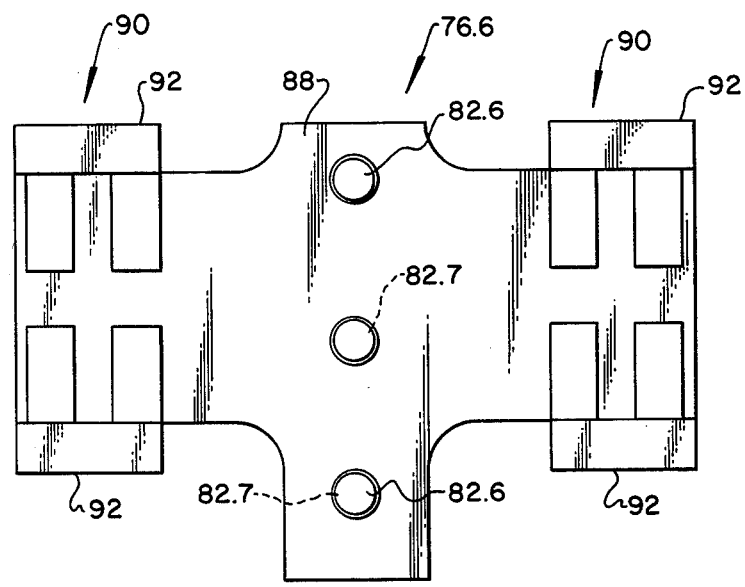
FIGS. 15 and 16 show a plan view and an end elevation respectively of further components of the displacement apparatus of FIGS. 13 and 14.
Figure 16:
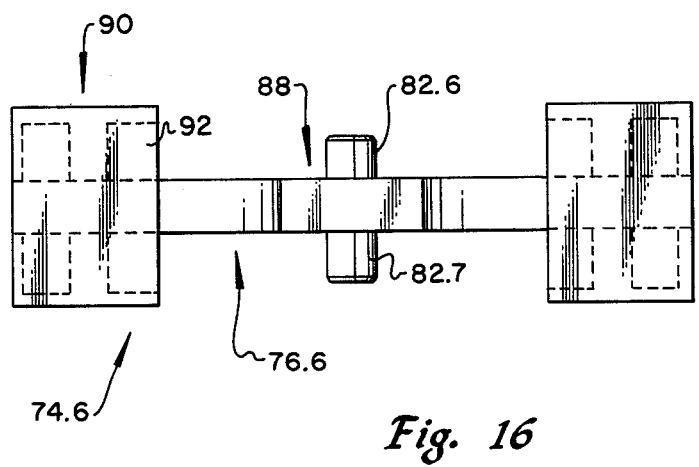

The displacement apparatus 74.6 further comprises an anchor member 76.6 as shown in FIGS. 15 and 16 of the drawings.

The anchor member 76.6 has a central zone 88 and has anchor zones 90 on opposed sides of the central zone 88.

Each anchor zone 90 has a pair of opposed abutment surfaces 92 which are positioned for the displacement rams of the displacement member 80.6 to abut against during use (in the same way as described with reference to FIG. 11 of the drawings). The central zone 88 is provided with a pair of anchor pins 82.6 which extend outwardly therefrom in one direction, and which are at a spacing corresponding to the spacing of the displacement bores 60.1.

The central zone 88 further has a pair of anchor pins 82.7 which project outwardly in the opposed direction and are at a spacing corresponding to the spacing of the displacement bores 60.2.

Therefore, depending upon which displacement bores 60.1 or 60.2 the anchor member 76.6 is to be engaged with, the pair of anchor pins 82.6 or the pair of anchor pins 82.7 may be employed.

For a hole size in the range of say about 8 inches in diameter, the displacement apparatus 74.4 may conveniently use a 50 ton hydraulic ram. For the apparatus 74.6, two 25 ton hydraulic rams may conveniently be used. These hydraulic rams are standard items which may be purchased off the shelf.

The invention provides the advantage that the displacement apparatus which is relatively small and inexpensive, can be utilized when available to assemble the conditioning tools 10 in the factory as well as on site without the dangers inherent in having to hammer stabilizer blades or other wall contacting members into or out of their operative positions in retainer slots. However, where such apparatus is not available, conventional hammering techniques can be applied to either displace the wall contacting members axially along the slots (the embodiment of FIG. 1), or either axially or radially relatively to the slots (the embodiment of FIG. 8).

We claim:

1. A borehole conditioning tool suitable for use in a drill string, the tool comprising:
    (a) a tubular body portion having a plurality of elongated, circumferentially spaced retainer slots for housing wall contacting members, each retainer slot being defined by a pair of opposed elongated slot side walls; and
    (b) a plurality of wall contacting members in the form of elongated stabilizer blades which are mounted in the retainer slots, each stabilizer blade having a pair of opposed blade side walls;

the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot.

2. A tool according to claim 1, in which the opposed blade side wall is in engagement with the opposed slot side wall along only a minor portion of the length of the blade side wall of each stabilizer blade.

3. A tool according to claim 1, in which the opposed blade side wall is in engagement with the opposed slot side wall in a plurality of spaced interference zones on each stabilizer blade.

4. A tool according to claim 3, in which the interference zones are provided proximate the opposed ends of each stabilizer blade.

5. A tool according to claim 4, in which the interference zones of each blade comprise between about 20% and about 40% of the length of the blade.

6. A tool according to claim 1, in which the slot side walls and blade side walls are shaped so that for each blade only a minor portion of each blade side wall will be in engagement with the slot side walls to provide short interference zones on both sides of each blade which locate the blade in position in the retainer slot.

7. A tool according to claim 1, including a plurality of key formations to prevent the stabilizer blades from radial displacement out of the retainer slots even if the interference engagements between the blades and slots fail.

8. A tool according to claim 1, including wall contacting members in the form of reamer members.

9. A borehole conditioning tool suitable for use in a drill string, the tool comprising:
    (a) a tubular body portion having a plurality of elongated, circumferentially spaced retainer slots for housing wall contacting members, each retainer slot being defined by a pair of opposed elongated slot side walls; and
    (b) a plurality of wall contacting members in the form of elongated stabilizer blades which are mounted in the retainer slots, each stabilizer blade having a pair of opposed blade side walls;

the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot, and each interference zone being provided by one slot side wall of each slot having at least one recessed zone which is recessed relatively to the remainder of the slot side wall, and by one blade side wall of each blade having at least one blade recess zone which is recessed relatively to the remainder of the blade side wall to prevent frictional engagement between the blade recess zones and the slot recess zones.

10. A tool according to claim 9, in which the blade and slot recess zones are recessed sufficiently to prevent frictional engagement between a blade recess zone and a slot side wall interference zone when they are in axial alignment, and to prevent frictional engagement between a slot recess zone and a blade side wall interference zone when they are in axial alignment.

11. A tool according to claim 10, in which the blade and slot recess and interference zones are positioned in a complementary spaced manner to allow each blade to be freely displaceable in a radial direction relatively to the tubular body portion when the interference zones of the blade and slot are not in axial alignment, and to frictionally locate the blade in the retainer slot when the blade and slot interference zones are in axial alignment.

12. A tool according to claim 11, in which each retainer slot is longer than each blade to allow the blades to be radially displaced relatively to the tubular body portion when the blade recess zones are in axial register with the slot interference zones, and to allow the blades to be axially displaced relatively to the slots to bring the blade and slot interference zones into and out of register with each other.

13. A tool according to claim 12, in which each slot has a length to accommodate a plurality of stabilizer blades, and in which a plurality of stabilizer blades are mounted in each slot.

14. A tool according to claim 12, including a plurality of nose blocks to provide protection for the stabilizer blades during use, each nose block being mounted in one retainer slot at the lower end of such slot, and each nose block having a tapered wear surface which is tapered outwardly in the direction of the upper end of the tool.

15. A tool according to claim 14, in which each nose block is mounted in position by means of an interference engagement between its side walls and the slot side walls.

16. A tool according to claim 15, in which each nose block is a separate member which is independent of the stabilizer blades.

17. A borehole conditioning tool suitable for use in a drill string, the tool comprising:
  (a) a tubular body portion having a plurality of elongated, circumferentially spaced retainer slots for housing wall contacting members, each retainer slot being defined by a pair of opposed elongated slot side walls;
  (b) a plurality of wall contacting members in the form of elongated stabilizer blades which are mounted in the retainer slots, each stabilizer blade having a pair of opposed blade side walls; and
  (c) a plurality of filler blocks, each filler block being mounted in one retainer slot at the upper end of such slot, to locate the stabilizer blades against axial displacement along the retainer slots;
the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot.

18. A tool according to claim 17, in which each filler block is mounted in position by means of an interference engagement between its side walls and the slot side walls.

19. A tool according to claim 17, in which each filler block comprises at least one shim which is jammed into position in the retainer slot to prevent any axial displacement of the stabilizer blades in the slots.

20. A tool according to claim 19, in which at least one shim is resiliently compressible in an axial direction relatively to the tubular body portion.

21. A tool according to claim 17, including a plurality of shims which are jammed into the retainer slots to locate the stabilizer blades against axial displacement relatively to the slots during use.

22. A borehole conditioning tool suitable for use in a drill string, the tool comprising:
  (a) a tubular body portion having a plurality of elongated, circumferentially spaced retainer slots for housing wall contacting members, each retainer slot being defined by a pair of opposed elongated slot side walls; and
  (b) a plurality of wall contacting members in the form of elongated stabilizer blades which are mounted in the retainer slots, each stabilizer blade having a pair of opposed blade side walls; and
  (c) a plurality of key formations, provided by complimentary mating flanges along one slot side wall of each slot and along one blade side wall of each blade, to prevent the stabilizer blades from radial displacement out of the retainer slots even if the interference engagements between the blades and slots fail;
the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot.

23. A tool according to claim 22, in which the complementary mating formations are arranged to correspond with the interference zones so that they are engaged while the interference zones are in alignment, and will be disengaged when the interference zones of the blades and slot side walls are out of alignment.

24. A borehole conditioning tool suitable for use in a drill string, the tool comprising:
  (a) a tubular body portion having a plurality of elongated, circumferentially spaced retainer slots for housing wall contacting members, each retainer slot being defined by a pair of opposed elongated slot side walls;
  (b) a plurality of wall contacting members in the form of elongated stabilizer blades which are mounted in the retainer slots, each stabilizer blade having a pair of opposed blade side walls, the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot; and
  (c) a plurality of key formations to prevent the stabilizer blades from radial displacement out of the retainer slots even if the interference engagements between the blades and slots fail, wherein the key formations comprise corresponding grooves along one slot side wall of each slot and along one blade side wall of each blade, and comprise key members which are removably located in the grooves.

25. A tool according to claim 24, in which the key members are shaped so that one key member will be held in position axially by another stabilizer blade in the same retainer slot.

26. A borehole conditioning tool system suitable for use in a drill string, the tool comprising:
  (a) a body portion having a plurality of elongated, circumferentially spaced retainer slots for housing wall contacting members, each retainer slot being defined by a pair of opposed elongated slot side walls; and (b) at least one wall contacting member in the form of an elongated stabilizer blade to be mounted in one of the retainer slots, the stabilizer blade having a pair of opposed blade side walls;

the slot side walls and blade side walls being shaped so that when the stabilizer blade is mounted in a retainer slot one blade side wall will engage with one slot side wall, while the opposed blade side wall will engage with the opposed slot side wall along only a portion of the length of the blade side wall in at least one interference zone, the degree of interference being sufficient to frictionally locate the blade in position in the slot.

27. A tool system according to claim 26, in which the slot side walls and blade side walls are shaped so that the opposed blade side wall will engage with the opposed slot side wall along two spaced interference zones constituting a minor portion of the length of the blade side wall.

28. A borehole conditioning tool suitable for use in a drill string, the tool comprising a tubular body portion having a plurality of elongated, circumferentially spaced retainer slots for receiving wall contacting members in the form of elongated stabilizer blades, each retainer slot being defined by first and second opposed elongated slot side walls in which the first slot side wall is generally planar along the length of the slot, and in which the second slot side wall has a recessed portion which is recessed relatively to the remainder of that wall for the remainder to define at least one raised area to constitute an interference zone to provide a frictional interference fit for a stabilizer blade when positioned in the slot between the interference zone and the first slot side wall.

29. A tool according to claim 28, in which the second side wall of each retainer slot has a plurality of spaced recess portions for the remainder of each second side wall to define a plurality of interference zones at spaced intervals along the length of the retainer slot.

30. A borehole conditioning tool suitable for use in a drill string, the tool comprising a tubular body portion having a plurality of elongated, circumferentially spaced retainer slots for receiving wall contacting members in the form of elongated stabilizer blades, each retainer slot being defined by first and second opposed elongated slot side walls with at least the second slot side wall having a plurality of recessed zones at spaced intervals along its length which are recessed relatively to the remainder of second slot side wall for the remainder to define a plurality of raised areas which comprise interference zones which are spaced along the length of the retainer slot to provide a frictional interference fit with at least one stabilizer blade between at least one of the interference zones and the first slot side wall when such a stabilizer blade is located in the slot.

31. A stabilizer blade to be mounted in an elongated slot of a borehole conditioning tool, the blade having first and second opposed elongated blade side walls, the first blade side wall being generally planar, and the second blade side wall having at least one recessed zone which is recessed relatively to the remainder of that blade side wall for the remainder to define at least one raised area which constitutes an interference zone, whereby the blade may be mounted in a slot of such a borehole conditioning tool such that it will be held between opposed slot side walls defining the slot by such side walls forming a frictional interference fit with the first blade side wall and with the interference zone on the second blade side wall.

32. A blade according to claim 31, having one recessed zone in its second blade side wall which is positioned intermediate the ends of the blade side wall for the remainder of that wall to define an interference zone proximate each end of the blade.

33. A borehole conditioning tool suitable for use in drilling operations, the tool comprising:

(a) a tubular body portion having a plurality of elongated circumferentially spaced retainer slots for housing wall contacting members, each retainer slot being defined by a pair of opposed elongated slot side walls in which at least one of the walls has a plurality of recess zones at spaced intervals along its length to define a plurality of raised areas which constitute interference zones at spaced intervals along the length of the slot; and (b) a plurality of elongated wall contacting members to be mounted along the length of each slot, each wall contacting member having a pair of opposed member side walls in which at least one member side wall has at least one recess zone and at least one raised zone which constitutes at least one interference zone, the recess and interference zones of the slot side walls thereby allowing any wall contacting member to be freely displaceable in a radial direction when positioned so that its interference and recess zones are in alignment with recess and interference zones respectively of a slot but to be frictionally located in a slot when positioned therein with an interference zone in alignment with an interference zone of the slot side wall to provide an interference fit.

34. A tool according to claim 33, having a plurality of wall contacting members mounted in end-to-end relationship along the length of each slot.

35. A tool according to claim 33, in which each wall contacting member has a displacement formation provided therein and in which the tubular body has corresponding displacement formations provided proximate each retainer slot, the displacement formations being engageable by engagement formations of a displacement apparatus to allow the wall contacting members to be displaced in an axial direction along the length of a slot for engaging or releasing corresponding interference zones.

36. A borehole conditioning tool suitable for use in a drill string, the tool comprising:

(a) a tubular body portion having a plurality of elongated circumferentially spaced retainer slots for housing wall contacting members, each retainer slot being defined by a pair of opposed elongated slot side walls; and (b) a plurality of elongated wall contacting members which are removably mounted in the retainer slots, each wall contacting member having a pair of opposed elongated member side walls;

the slot side walls and member side walls being shaped so that for each wall contacting member one member side wall is in frictional contact with one slot side wall along a major portion of the length of the member side wall, while the opposed member side wall is in interference contact with the slot side wall along only a minor portion of the length of the member side wall to frictionally locate the wall contacting member in the slot.

37. A borehole conditioning tool suitable for use in a drill string, the tool comprising:

(a) a tubular body portion having a plurality of elongated circumferentially spaced retainer slots for housing wall contacting members, each retainer slot being defined by a pair of opposed elongated slot side walls; and (b) at least one elongated wall contacting member to be removably mounted in one of the retainer slots, the wall contacting member having a pair of opposed elongated member side walls;

the slot side walls and member side walls being shaped so that when the wall contacting member is mounted in one retainer slot, one member side wall will be in frictional contact with one slot side wall along a major portion of the length of the member side wall, while the other member side wall will be in interference contact with the slot side wall along only a minor portion of the length of the member side wall to frictionally locate the wall contacting member in the slot.

38. A borehole conditioning tool suitable for use in a drill string, the tool comprising:

(a) a tubular body portion having a plurality of elongated circumferentially spaced retainer slots for housing wall contacting members, each retainer slot being defined by a pair of opposed elongated slot side walls;

(b) a plurality of wall contacting members to be removably mounted in the retainer slots for conditioning the walls of a borehole during use; and (c) a plurality of nose blocks which are to be mounted in the slots with one nose block at the lower end of each slot, each nose block having a tapered wear surface which tapers outwardly toward an upper end of the nose block for the nose blocks to provide protecting for the wall contacting members against undercutting during use.

39. A borehole conditioning tool suitable for use in drilling operations, the tool comprising:

(a) a tubular body portion having a plurality of elongated circumferentially spaced retainer slots for housing wall contacting members, each retainer slot being defined by a pair of opposed elongated slot side walls in which at least one of the walls has a plurality of recess zones at spaced intervals along its length to define a plurality of raised areas which constitute interference zones at spaced intervals along the length of the slot;

(b) a plurality of elongated wall contacting members to be mounted along the length of each slot, each wall contacting member having a pair of opposed member side walls in which at least one member side wall has at least one recess zone and at least one raised zone which constitutes at least one interference zone, the recess and interference zones of the slot side walls thereby allowing any wall contacting member to be freely displaceable in a radial direction when positioned so that its interference and recess zones are in alignment with recess and interference zones respectively of a slot but to be frictionally located in a slot when positioned therein with an interference zone in alignment with an interference zone of the slot side wall to provide an interference fit, in which each wall contacting member has a displacement formation provided therein and in which the tubular body has corresponding displacement formations provided proximate each retainer slot, the displacement formations being engageable by engagement formations of a displacement apparatus to allow the wall contacting members to be displaced in an axial direction along the length of a slot for engaging or releasing corresponding interference zones;

(c) an anchor member having engagement formation means for engagement with at least one displacement formation of a wall contacting member of the tool;

(d) a displacement member having engagement formation measns for engagement with at least one displacement formation of a wall contacting member or of the tool, and having ram means which is displaceable relatively to the member to provide a displacement force; and (e) the anchor member and displacement member being adapted to be mounted in position with their engagement formation means in engagement with separate components of the tool, and the displacement member being adapted to be actuated for the ram means to be displaced to engage with the anchor member and provide a displacement force for displacing the anchor member and the displacement member relatively to each other and thus the separate components relatively to each other in the axial direction along a retainer slot.

40. Displacement apparatus according to claim 39, in which the displacement member comprises a cradle member having a central locating portion whereon the engagement formation means is provided, having a cradle formation on each side of the central locating portion, and having a ram member mounted in each cradle formation, the cradle formations being positioned relatively to the central locating portion so that the ram members will provide their displacement force in the approximate plane of the center of a wall contacting member during use to minimize any tendency for lateral or radial movement of a wall contacting member during axial displacement of such wall contacting member.

41. A borehole conditioning tool suitable for use in a drill string, the tool comprising:

(a) a tubular body portion having a plurality of elongated, circumferentially spaced retainer slots for housing wall contacting members, each retainer slot being defined by a pair of opposed elongated slot side walls; and (b) a plurality of wall contacting members in the form of elongated stabilizer blades which are mounted in the retainer slots, each stabilizer blade having a pair of opposed blade side walls;

the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot, and each interference zone being provided by one blade side wall of each stabilizer blade having at least one recessed zone which is recessed relatively to such interference zone to prevent frictional engagement between the slot side wall and such recessed zone.

42. A borehole conditioning tool suitable for use in a drill string, the tool comprising:

(a) a tubular body portion having a plurality of elongated, circumferentially spaced retainer slots for housing wall contacting members, each retainer slot being defined by a pair of opposed elongated slot side walls; and (b) a plurality of wall contacting members in the form of elongated stabilizer blades which are mounted in the retainer slots, each stabilizer blade having a pair of opposed blade side walls;

the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot, and each interference zone being provided by one slot side wall of each slot having at least one recessed zone which is recessed relatively to such interference zone to prevent frictional engagement between the blade side wall and such recessed zone.

43. A borehole conditioning tool suitable for use in a drill string, the tool comprising:
(a) a tubular body portion having a plurality of elongated, circumferentially spaced retainer slots for housing wall contacting members, each retainer slot being defined by a pair of opposed elongated slot side walls; and
(b) a plurality of wall contacting members in the form of elongated stabilizer blades which are mounted in the retainer slots, each stabilizer blade having a pair of opposed blade side walls; and
(c) wall contacting members in the form of reamer members mounted in the retainer slots;

the slot side walls and blade side walls being shaped so that for each stabilizer blade one blade side wall is in engagement with one slot side wall, while the opposed blade side wall is in engagement with the opposed slot side wall along only a portion of the length of the blade side wall in at least one interference zone, the degree of interference being sufficient to locate the blade in position in the slot.

44. A borehole conditioning tool suitable for use in drilling operations, the tool comprising:
(a) a tubular body portion having a plurality of elongated, circumferentially spaced retainer slots for housing wall contacting members, each retainer slot being defined by a pair of opposed elongated slot side walls in which at least one of the walls has a plurality of recess zones at spaced intervals along its length to define a plurality of raised areas which constitute interference zones at spaced intervals along the length of the slot; and
(b) a plurality of elongated wall contacting members, mounted in end-to-end relationship along the length of each slot, each wall contacting member having a pair of opposed member side walls in which at least one member side wall has at least one recess zone and at least one raised zone which constitutes at least one interference zone, the recess and interference zones of the slot side walls thereby allowing any wall contacting member to be freely displaceable in a radial direction when positioned so that its interference and recess zones are in alignment with recess and interference zones respectively of a slot but to be frictionally located in a slot when positioned therein with an interference zone of the slot side wall to provide an interference fit;

in which each wall contacting member has a displacement formation provided therein and in which the tubular body has corresponding displacement formations provided proximate each retainer slot, the displacement formations being engageable by engagement formations of a displacement apparatus to allow the wall contacting members to be displaced in an axial direction along the length of a slot for engaging or releasing corresponding interference zones.

45. A borehole conditioning tool suitable for use in a drill string, the tool comprising:
(a) a tubular body portion having a plurality of elongated, circumferentially spaced retainer slots for housing wall contacting members, each retainer slot being defined by a pair of opposed elongated slot side walls;
(b) a plurality of wall contacting members which are removably mounted in the retainer slots, each wall contacting member having a pair of opposed elongated member side walls; and
(c) a nose block which is mounted at the lower end of each slot to provide protection for the wall contacting members, including a filler block which is mounted at the upper end of each slot to fill the length of each slot thereby locating the wall contacting members and the nose blocks against axial displacement in the slots, and including key formations to locate the members against radial dislodgement out of the slots;

the slots side walls and member side walls being shaped so that for each wall contacting member one member side wall is in frictional contact with one slot side wall along a major portion of the length of the member side wall, while the opposed member side wall is in interference contact with the slot side wall along only a minor portion of the length of the member side wall to frictionally locate the wall contacting member in the slot.

* * * * *